US012627063B2

(12) United States Patent
Liu et al.

(10) Patent No.: US 12,627,063 B2
(45) Date of Patent: May 12, 2026

(54) BASE STATION ANTENNA AND A REFLECTOR FOR THE BASE STATION ANTENNA

(71) Applicant: Outdoor Wireless Networks LLC, Claremont, NC (US)

(72) Inventors: Qiang Liu, Suzhou (CN); Xun Zhang, Suzhou (CN); Changfu Chen, Suzhou (CN); Nengbin Liu, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 238 days.

(21) Appl. No.: 18/491,045

(22) Filed: Oct. 20, 2023

(65) Prior Publication Data

US 2024/0136725 A1 Apr. 25, 2024
US 2024/0235040 A9 Jul. 11, 2024

(30) Foreign Application Priority Data

Oct. 24, 2022 (CN) ........................ 202211301204.X

(51) Int. Cl.
*H01Q 13/10* (2006.01)
*H01Q 15/14* (2006.01)

(52) U.S. Cl.
CPC ............. *H01Q 13/10* (2013.01); *H01Q 15/14* (2013.01)

(58) Field of Classification Search
CPC ............................... H01Q 15/14; H01Q 19/10
See application file for complete search history.

(56) References Cited

U.S. PATENT DOCUMENTS

| | | | | |
|---|---|---|---|---|
| 6,040,802 | A * | 3/2000 | Smith | H01Q 21/061 343/778 |
| 2013/0076453 | A1* | 3/2013 | Lai | H01P 1/184 333/125 |
| 2020/0303836 | A1* | 9/2020 | Li | H01Q 21/245 |
| 2021/0305717 | A1* | 9/2021 | Hou | H01Q 15/14 |
| 2021/0320413 | A1* | 10/2021 | Wu | H01Q 1/246 |
| 2022/0407240 | A1* | 12/2022 | Bisiules | H01Q 1/246 |
| 2023/0335902 | A1* | 10/2023 | Luo | H01Q 5/307 |
| 2024/0039145 | A1* | 2/2024 | Liu | H01Q 15/0013 |

FOREIGN PATENT DOCUMENTS

| | | | | |
|---|---|---|---|---|
| JP | 2004349928 A | * | 12/2004 | |
| WO | WO-2022133922 A1 | * | 6/2022 | H01Q 5/307 |

* cited by examiner

*Primary Examiner* — Seokjin Kim
(74) *Attorney, Agent, or Firm* — Myers Bigel, P.A.

(57) ABSTRACT

A reflector for a base station antenna comprises: a body; and at least one slot provided in the body, where the at least one slot is configured for forming at least one stub-type filtering structure in the body. The stub-type filtering structure is configured for at least partially inhibiting an induced current in the body within an operating frequency band of a radiating element mounted behind the reflector.

20 Claims, 5 Drawing Sheets

BASE STATION ANTENNA AND A REFLECTOR FOR THE BASE STATION ANTENNA

CROSS-REFERENCE TO RELATED APPLICATION

The present application claims priority to Chinese Patent Application No. 202211301204.X, filed Oct. 24, 2022, the entire content of which is incorporated herein by reference as if set forth fully herein.

FIELD

The present disclosure relates to the field of radio communication, and more particularly, to a base station antenna and a reflector for the base station antenna.

BACKGROUND

With the development of wireless communication technology, an integrated base station antenna including a passive module and an active module has emerged. The passive module may include one or more arrays of the radiating element configured to generate relatively static antenna beams, such as antenna beams that are configured to cover a 120-degree sector (in the azimuth plane) of the integrated base station antenna. The arrays may include arrays that operate under second generation (2G), third generation (3G) or fourth generation (4G) cellular network standards. These arrays are not configured to perform active beamforming operations, although they typically have remote electronic tilt (RET) capabilities which allow the pointing direction of the antenna beam in the elevation plane to be changed via electromechanical means in order to change the coverage area of the antenna beam. The active module may include one or more arrays of the radiating element operating under fifth generation (5G or higher version) cellular network standards. In 5G mobile communication, the frequency range of communication includes a main frequency band (specific portion of the range 450 MHz-6 GHz) and an extended frequency band (24 GHz-73 GHz, i.e. millimeter wave frequency band, mainly 28 GHz, 39 GHz, 60 GHz and 73 GHz). The frequency range used in 5G mobile communication includes frequency bands that use higher frequencies in the previous generations of mobile communication. These arrays typically have individual amplitude and phase control over subsets of the radiating element therein and perform active beamforming.

As shown in FIG. 1 and FIG. 2, the integrated base station antenna 10 may include a passive module 11 and an active module 12 mounted on the back of or behind the passive module 11. The passive module 11 includes one or more arrays of the radiating element 115 mounted to extend forwardly from the reflector 13 of the passive module 11 (as shown in FIG. 3). The reflector 13 acts to reflect electromagnetic waves that are emitted backwardly by the radiating element 115 in the forward direction, and the reflector 13 also serves as a ground plane for the radiating element 115 of the arrays. The active module 12 is capable of emitting high-frequency electromagnetic waves (such as, high-frequency electromagnetic waves in the 2.3-4.2 GHz frequency band or a portion thereof). At least a portion of the active module 12 is typically mounted behind the passive module 11.

Since the reflector 13 in the passive module 11 is configured forwardly of the active module 12, when the electromagnetic wave from the active module 12 is radiated forwardly through the passive module 11, an induced current, such as an induced current within the operating frequency band of the active module 12, may be formed or otherwise induced on the reflector 13 of the passive module 11. Such an induced current may lead to poor radiation performance of the integrated base station antenna 10, such as distortion of the radiation pattern or "antenna beams" of the active module 12 and/or reduced cross-polar discrimination, etc. Current countermeasures generally include reducing the size of the reflector 13. However, the effect of the countermeasures is limited because the size of the reflector 13 can only be reduced to a limited extent, and there is still an induced current on the reflector 13. In addition, as the size of the reflector 13 decreases, the radiation pattern of the passive module 11 will also deteriorate.

SUMMARY

According to a first aspect of the present disclosure, a reflector for the base station antenna is provided, wherein the reflector comprises: a body; and at least one slot provided in the body, wherein the at least one slot is configured for forming at least one stub-type filtering structure in the body, and the stub-type filtering structure is configured for at least partially inhibiting an induced current in the body within an operating frequency band of a radiating element mounted behind the reflector.

In some embodiments, the at least one stub-type filtering structure may include at least one open stub.

In some embodiments, the longitudinal length of the at least one open stub may be 0.25+n/2 times the equivalent wavelength, n being the natural number, wherein the equivalent wavelength is the wavelength at the predetermined frequency point within the operating frequency band.

In some embodiments, the longitudinal length of the at least one open stub may be configured as 0.25 times the equivalent wavelength.

In some embodiments, the predetermined frequency point may be a center frequency point within the operating frequency band.

In some embodiments, the at least one slot may include an H-, L-, M-, U-, S-, or fan-shaped slot for forming the at least one open stub.

In some embodiments, the at least one stub-type filtering structure may include at least one closed stub.

In some embodiments, the longitudinal length of the at least one closed stub may be N/2 times the equivalent wavelength, N being a positive integer, wherein the equivalent wavelength is a wavelength at a predetermined frequency point within the operating frequency band.

In some embodiments, the longitudinal length of the at least one closed stub may be configured as 0.5 times the equivalent wavelength.

In some embodiments, the predetermined frequency point may be a center frequency point within the operating frequency band.

In some embodiments, the at least one slot may comprise two slots for forming a single closed stub between the two slots.

In some embodiments, the slot may be configured as a metal-free cutout on the body.

In some embodiments, the at least one stub-type filtering structure may include multiple stub-type filtering structures arranged acyclically in at least one direction.

In some embodiments, the at least one direction may include a vertical direction and/or a horizontal direction of the reflector.

In some embodiments, the multiple stub-type filtering structures may include at least one open stub and at least one closed stub.

In some embodiments, at least two of the multiple stub-type filtering structures may have different orientations, sizes, and/or shapes.

In some embodiments, the at least one stub-type filtering structure may include: a first stub-type filtering structure configured to at least partially inhibit a first induced current within a predetermined first frequency band; and a second stub-type filtering structure configured to at least partially inhibit a second induced current within a predetermined second frequency band; wherein the first frequency band is the operating frequency band and is different from the second frequency band.

In some embodiments, the first and second stub-type filtering structures may be open stubs with different longitudinal lengths or closed stubs with different longitudinal lengths.

In some embodiments, one of the first and second stub-type filtering structures may be an open stub and the other may be a closed stub.

In some embodiments, the at least one stub-type filtering structure may include a multi-order stub-type filtering structure.

In some embodiments, the body may include a reflective strip section extending in a vertical direction, wherein the reflective strip section is configured for mounting a radiating element, and the at least one slot is at least partially provided on the reflective strip section for forming at least one stub-type filtering structure on the reflective strip section.

In some embodiments, the body may include a first reflective strip section and a second reflective strip section at the side in the horizontal direction, and an opening is provided between the first reflective strip section and the second reflective strip section.

In some embodiments, the reflector may include a fence extending in a vertical direction, and the fence extends forwardly from the body of the reflector.

In some embodiments, at least one additional slot may be provided on the fence, and the at least one additional slot configured for forming at least one additional stub-type filtering structure in the fence, wherein the at least one additional stub-type filtering structure is configured to at least partially inhibit the induced current within the predetermined frequency band in the fence.

According to a first aspect of the present disclosure, a base station antenna is provided, and the base station antenna includes the reflector for the base station antenna described above.

In some embodiments, the base station antenna may include a passive module and an active module mounted behind the passive module, wherein the reflector and a reflection compensation plate separated from the reflector are mounted within the passive module, and the reflection compensation plate includes a frequency-selective surface composed of multiple pattern units arranged periodically.

In some embodiments, the frequency-selective surface may be configured to reflect electromagnetic waves within a second frequency band and allow electromagnetic waves within a first frequency band to pass through, wherein the first frequency band corresponds to the operating frequency band of at least a portion of the radiating element inside the passive module and the second frequency band corresponds to the operating frequency band.

In some embodiments, the reflector may include a first reflective strip section and a second reflective strip section for mounting radiating elements, and an opening is provided between the first reflective strip section and the second reflective strip section, wherein, the reflection compensation plate is mounted after the reflector and at least partially overlaps the opening in the projection in the forward direction.

In some embodiments, the reflection compensation plate may be mounted in front of the rear radome of the passive module, or the reflection compensation plate is configured as at least a portion of the rear radome of the passive module.

In some embodiments, the multiple pattern units may be metal pattern units configured on a metal plate or on a printed circuit board.

In some embodiments, the passive module may comprise a 4G module or a 5G module.

DETAILED DESCRIPTION

Figure 1:
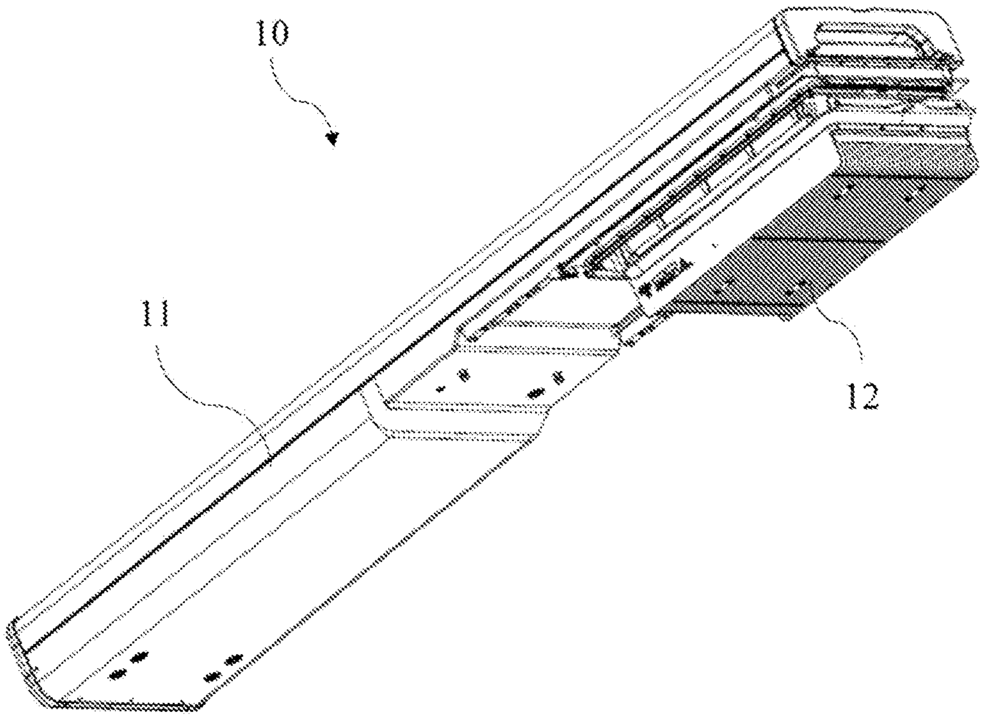
FIG. 1 is a schematic three-dimensional view of a base station antenna according to the prior art, wherein the base station antenna includes a passive module and an active module mounted on the back of the passive module.

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that the terms used herein are only used to describe specific embodiments, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, spatial relationship terms such as "upper", "lower", "left", "right", "front", "back", "high", and "low" can explain the relationship between one feature and another in the attached drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features". The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "schematic" or "exemplary" means "serving as an example, instance or explanation", not as a "model" to be accurately copied". Any realization method described exemplarily herein may not be necessarily interpreted as being preferable or advantageous over other realization methods. Furthermore, the present disclosure is not limited by any expressed or implied theory given in the above technical field, background art, summary of the invention or embodiments.

As used herein, the word "basically" means including any minor changes caused by design or manufacturing defects, device or component tolerances, environmental influences, and/or other factors.

As used herein, the term "partially" may be a part of any proportion. For example, it may be greater than 10%, 20%, 30%, 40%, 50%, 60%, 70%, 80%, 90%, or may even be 100%, i.e. all.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should be noted herein that the base station antennas in FIGS. 1 to 10 mainly differ in the reflector of the passive module. Therefore, in order to not obscure the focus of the present disclosure and to facilitate the reader's understanding, the same reference numerals are used for the same components in FIGS. 1 to 10. In addition, for ease of illustration the embodiments of the base station antenna according to the present disclosure are also described in the following with the aid of FIGS. 1 to 3.

Figure 4:
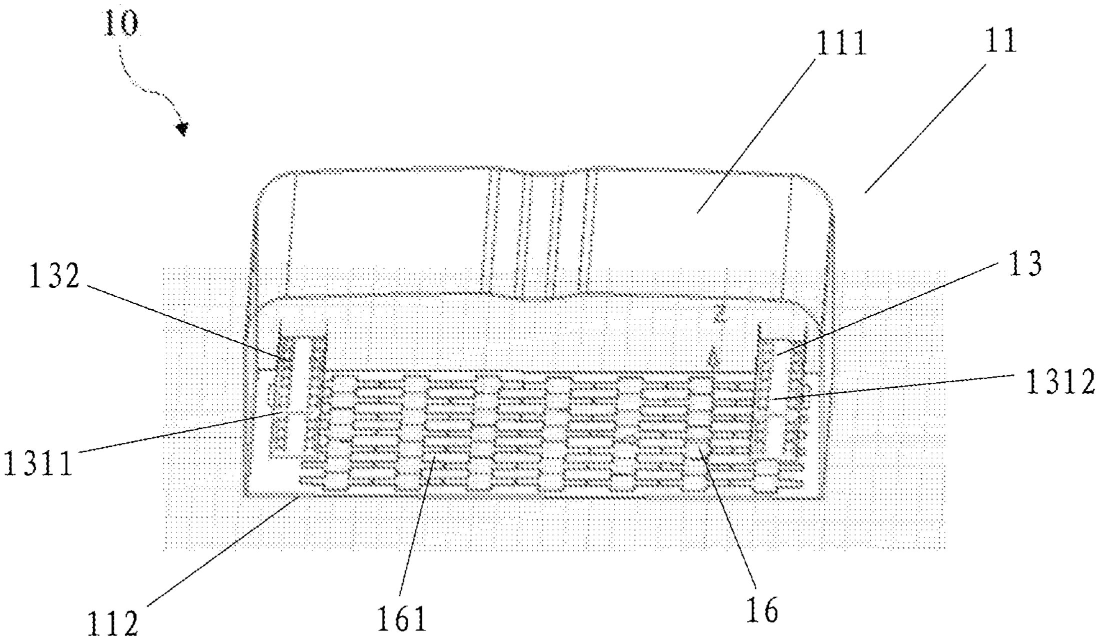
FIG. 4 is a partially schematic perspective view of a passive module of the base station antenna according to some embodiments of the present disclosure.
Figure 5:
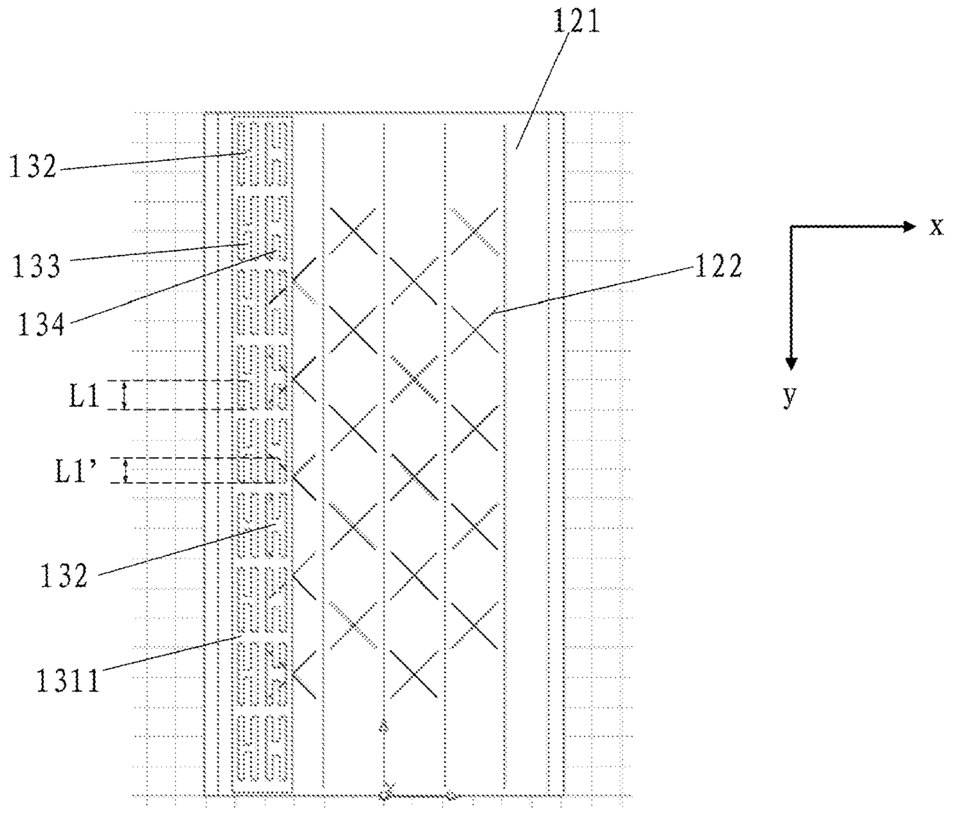
FIG. 5 is a partially schematic front view of the base station antenna in FIG. 4, showing the reflective strip section of the reflector inside the passive module together with the reflector and radiating element array inside the active module in the rear.
Figure 6:
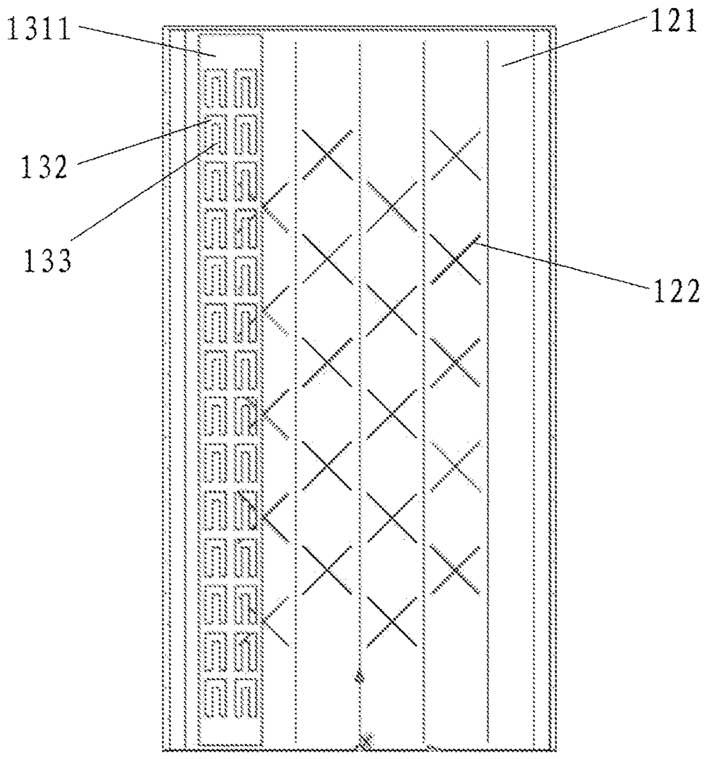
FIG. 6 is a partially schematic front view of the base station antenna according to some other embodiments of the present disclosure, showing the reflective strip section of the reflector inside the passive module together with the reflector and radiating element array inside the active module in the rear.

FIG. 4 shows a partially schematic perspective view of the passive module of a base station antenna according to some embodiments of the present disclosure. FIG. 5 shows a partially schematic front view of the base station antenna of FIG. 4, showing the reflective strip section of the reflector inside the passive module together with the reflector and radiating element array inside the active module in the rear; FIG. 6 shows a partially schematic front view of the base station antenna according to some other embodiments of the present disclosure, showing the reflective strip section of the reflector inside the passive module together with the reflector and radiating element array inside the active module in the rear.

Figure 2:
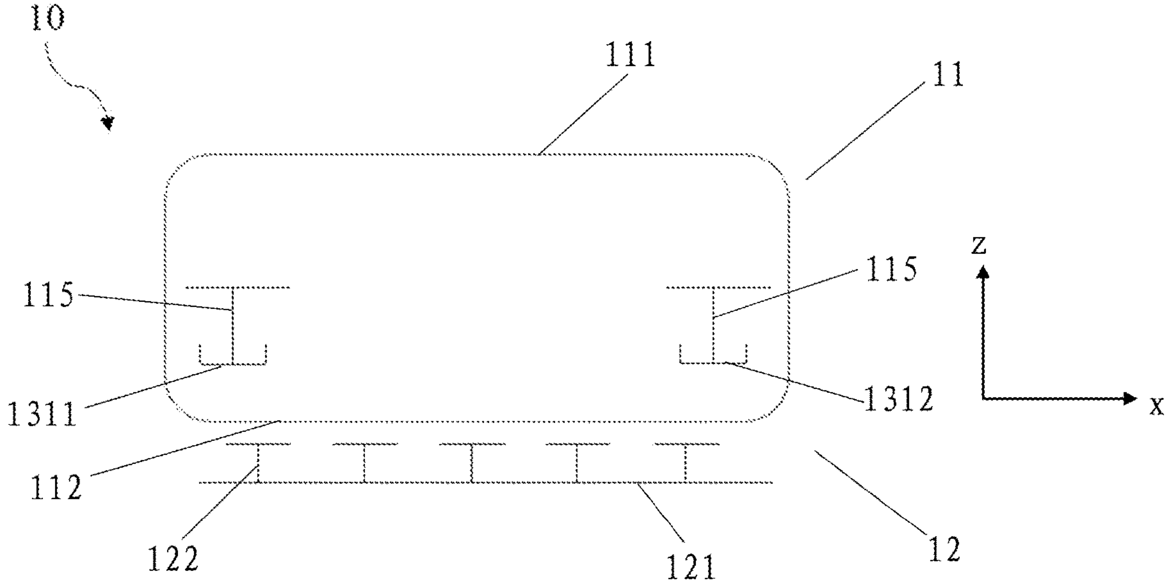
FIG. 2 is a schematic end view in the base station antenna shown in FIG. 1.

The base station antenna 10 according to the present disclosure may include a passive module 11 and an active module 12 mounted behind the passive module 11 (not shown in FIG. 4, please refer to FIG. 1 and FIG. 2).

Passive module 11 may include the front radome 111, the rear radome 112, and the reflector 13 between the front radome 111 and the rear radome 112, as well as one or more arrays of radiating elements 115 (not shown in FIG. 4, adaptively referring to FIG. 2) in front of the reflector 13 (the arrays are usually mounted on the feeder panel in front of the reflector). These arrays are mounted to extend forwardly from the reflector 13 of the passive module 11, and these arrays may include arrays that operate under second generation (2G), third generation (3G) or fourth generation (4G) cellular network standards. The front radome 111 and the rear radome 112 of the passive module 11 may be configured as an integral antenna radome, or the front radome 111 and the rear radome 112 may be configured as separate antenna radome components.

Referring adaptively to FIG. 2, the active module 12 may be mounted behind the passive module 11, and may include its own reflector 121 and one or more arrays of radiating elements 122 on the reflector 121. These arrays are mounted to extend forwardly from the reflector 121 of the active module 12, and these arrays may include arrays that operate under fifth or higher generation (5G or 6G) cellular network standards. In 5G mobile communication, the frequency range of communication includes a main frequency band (specific portion of the range 450 MHz-6 GHz) and an extended frequency band (24 GHz-73 GHz, i.e. millimeter wave frequency band, mainly 28 GHz, 39 GHz, 60 GHz and 73 GHz).

Figure 3:
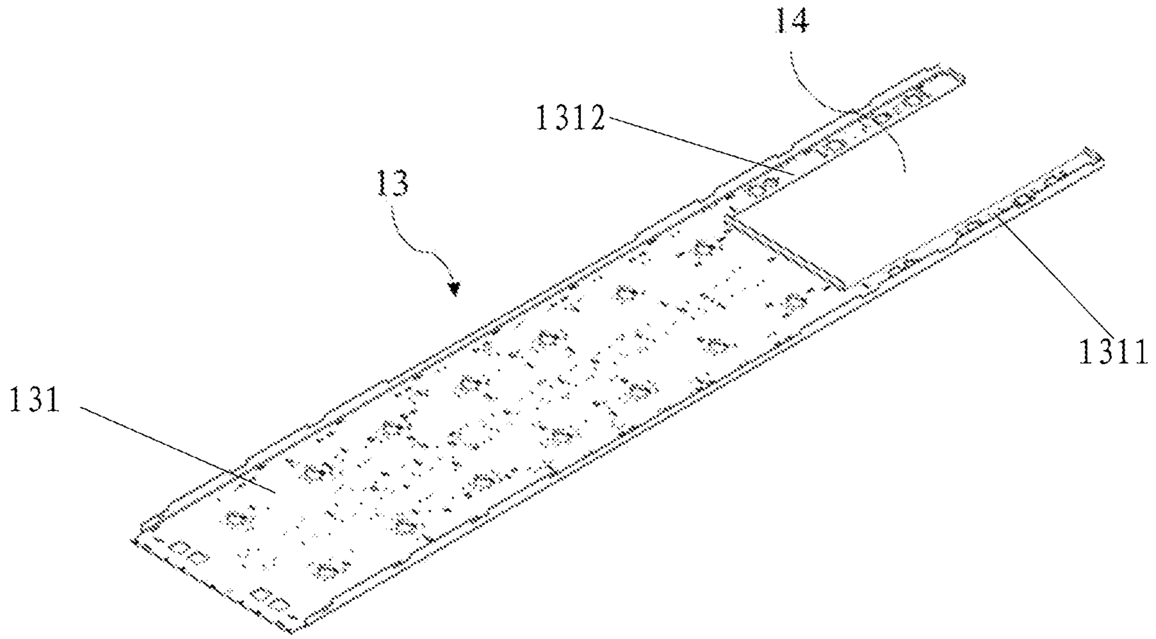
FIG. 3 is a perspective view of a reflector used in the base station antenna shown in FIG. 1.

Referring adaptively to FIGS. 2 to 3, in order not to obstruct the high-frequency electromagnetic waves emitted by the active module 12, an opening 14 is generally provided on the reflector 13 of the passive module 11. The active module 12 may be installed at a position corresponding to the opening 14 so that the high-frequency electromagnetic waves emitted by the active module 12 can pass through the opening 14. At the side in the horizontal direction x of the opening 14, the body 131 of the reflector 13 may include a first reflective strip section 1311 and a second reflective strip section 1312 extending in the vertical direction y. The first reflective strip section 1311 and the second reflective strip section 1312 may be provided outside the corresponding range of the active module 12 and may be configured to mount the radiating element 115.

In order to reflect electromagnetic waves within a predetermined frequency band, such as signals radiated backward by the radiating element 115 mounted on the reflective strip sections 1311 and 1312, a separate reflection compensation plate 16 may be provided inside the passive module 11. The reflection compensation plate 16 may be mounted behind the reflective strip sections 1311 and 1312 to partially or completely overlap the opening 14 formed in the body 131 of the reflector 13 in the forward direction z. As such, the reflection compensation plate 16 can at least partially compensate for the negative impact of the reflection performance caused by the opening 14 provided in the reflector 13.

In some embodiments, the reflection compensation plate 16 may be mounted in front of the rear radome of the passive module 11. In some embodiments, the reflective compensation plate 16 may be configured as at least a portion of the rear radome of a passive module. In order to avoid the negative impact of the reflection compensation plate 16 on the active module 12 installed in the rear radome 112 of the passive module 11, the reflective compensation plate 16 may include a frequency selective surface composed of multiple pattern units 161, for example arranged periodically in a first direction and a second direction (for example, vertical direction y and horizontal direction x), wherein the frequency-selective surface may be configured to allow electromagnetic waves within a predetermined frequency band, such as electromagnetic waves emitted by the active module 12, to pass through, while reflecting electromagnetic waves emitted by the passive module 11. In some embodiments, the multiple pattern units 161 may be metal pattern units configured on a metal plate or on a PCB substrate. The resonant frequency of the reflection compensation plate 16 may be configured by selecting or designing the style and size of each pattern unit 161, as well as the spacing and arrangement, etc. of multiple pattern units 161 to enable electromagnetic waves within a predetermined frequency band to pass through the reflection compensation plate 16.

As described at the beginning of this document, since the reflector 13 of the passive module 11 is provided in front of the active module 12, an induced current may be formed or otherwise induced on the reflector 13 when the electromagnetic waves from the active module 12 are radiated onto the reflector 13 of the passive module 11. The induced current may be, for example, an induced current within the operating frequency band of the radiating element 122 of the active module 12. Such an induced current may adversely affect the radiation performance of the base station antenna 10, such as causing the distortion of the radiation pattern of the active module 12. This is not desired.

In order to inhibit the formation of an induced current on the reflector 13 and avoid the aforementioned potential adverse effects, the present disclosure proposes a new reflector 13 for the base station antenna 10. Referring to FIGS. 4 and 5, at least one slot 132 is provided in the body 131 of the reflector 13 according to the present disclosure, and the at least one slot 132 is configured to form at least one stub-type filtering structure in the body 131, and the stub-type filtering structure is configured to at least partially inhibit the induced current within a predetermined frequency band in the body 131. In the present disclosure, "slot" may be understood as a metal-free cutout in the body.

By introducing a specific slot 132 in the body 131 of the reflector 13 to form a stub-type filtering structure (such as, open stubs 133 and 134, or closed stub 135), the induced current within the predetermined frequency band can be targetedly inhibited in the body 131, thereby effectively reducing or eliminating the negative impact of the induced current on the radiation performance of the base station antenna 10. It should be understood that the slot 132 of the present disclosure may be provided at any position of the reflector 13, as long as the induced current needs to be inhibited at the corresponding position of the reflector 13.

In particular, referring to FIGS. 4 and 5, at least one slot 132 may be at least partially provided in the body 131 of the reflector 13 where the induction current needs to be inhibited, for example in the reflective strip sections 1311 and 1312 near the active module 12, for forming at least one said stub-type filtering structures in the area. The at least one stub-type filtering structure may include at least one open stub 133 or 134. For this end, as shown in FIG. 5, the slot 132 may be provided to be H-shaped. Thus, by setting an H-shaped slot 132, two opposing open stubs 133 and 134 can be formed. However, it is contemplated that the slot 132 may also be provided in other suitable shapes depending on actual needs, such as in an U shape shown in FIG. 6. Further, in some embodiments not shown, the slot 132 may also be provided in an L-, M-, S-, or scalloped shape.

In some embodiments, the longitudinal length L1 of the open stubs 133 and 134 may be configured as 0.25+n/2 times the equivalent wavelength, n being the natural number, wherein the equivalent wavelength is the wavelength at the predetermined frequency point within the predetermined frequency band. Here, "longitudinal length L1 of the open stubs 133 and 134" can be understood as the length from the free end of the open stub 133 or 134 to its root (please refer to the longitudinal length L1 in FIG. 5). The predetermined frequency band may be an operating frequency band of at least a portion of the radiating element 122 inside the active module 12, and the predetermined frequency point may be a center frequency point of the predetermined frequency band. Typically, to reduce the longitudinal length L1 of the open stubs 133 and 134, n may be determined as 0. That is, the longitudinal length L1 of the open stubs 133 and 134 may be configured as 0.25 times the equivalent wavelength.

In some embodiments, the stub-type filtering structure formed in the body 131 of the reflector 13 may include: A first stub-type filtering structure configured to at least partially inhibit a first induced current within the predetermined first frequency band; and a second stub-type filtering structure configured to at least partially inhibit a second induced current within the predetermined second frequency band; wherein the first frequency band is different from the second frequency band. Thus, the induced current within a different (that is, wider) predetermined frequency band can be inhibited in the body 131 of the reflector 13. Here, the first and second stub-type filtering structures may be configured as a first open stub 133 and a second open stub 134 with different longitudinal lengths L1 and L1 as shown in FIG. 5, respectively. Alternatively, the first stub-type filtering structure and the second stub-type filtering structure may also be configured as a closed stub 135 with different longitudinal lengths L2 (closed stub 135 will be described in greater detail below with reference to FIG. 10). In some embodiments not shown, one of the first and second stub-type filtering structures may be configured as the open stub 133 or 134, and the other may be configured as the closed stub 135.

Figure 7:
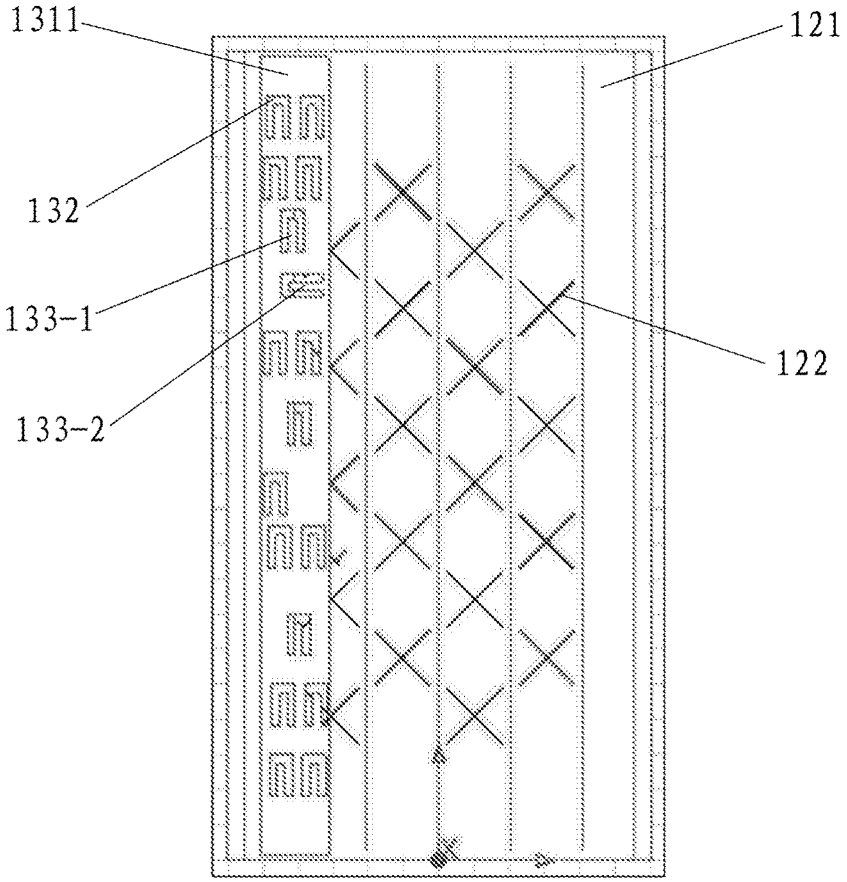
FIG. 7 is a partially schematic front view of the base station antenna according to some other embodiments of the present disclosure, showing the reflective strip section of the reflector inside the passive module together with the reflector and radiating element array inside the active module in the rear.

FIG. 7 shows a partial front view of the reflector 13 of the base station antenna 10 according to some other embodiments of the present disclosure. As shown in FIG. 7, suitably, the slot 132 may be provided at any location of the reflector 13 where the induced current needs to be inhibited, and may be provided in any suitable shape, orientation, and/or size to meet specific induced current inhibition requirements. That is, the slot 132 in the reflector 13 may be arranged acyclically in at least one direction (such as the vertical direction y or the horizontal direction x of the reflector 13). Accordingly, the stub-type filtering structure formed by the slot 132 may include multiple stub-type filtering structures arranged acyclically in at least one direction (e.g., the vertical direction y or the horizontal direction x of the reflector 13). Here, at least two of the multiple stub-type filtering structures may have different orientations, sizes (e.g., longitudinal lengths), and/or shapes. For example, the two stub-type filtering structures configured in FIG. 7 as open stubs 133-1 and 133-2 have different orientations. Although the multiple stub-type filtering structures in FIG. 7 are all open stubs 133, it is contemplated that the multiple stub-type filtering structures may include at least one open stub 133 or 134 and at least one closed stub 135, or may include only closed stubs 135.

Figure 8:
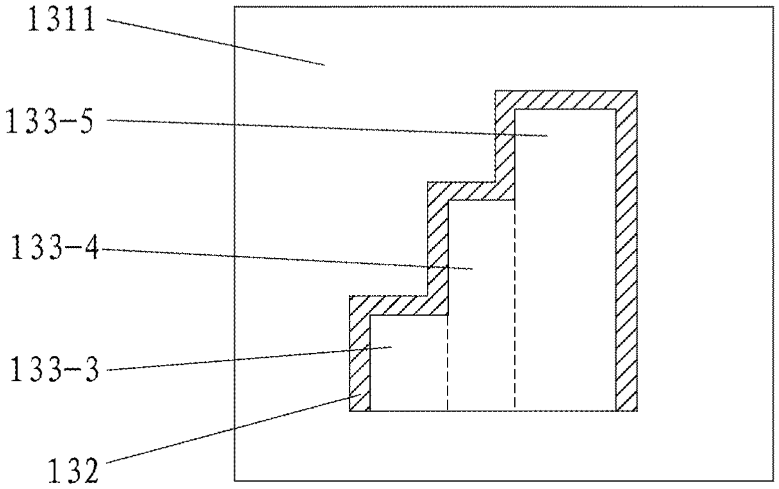
FIG. 8 is a front view of a stub-type filtering structure in a reflector of the base station antenna according to some other embodiments of the present disclosure.

FIG. 8 shows a front view of a stub-type filtering structure in the reflector 13 of the base station antenna 10 according to some other embodiments of the present disclosure. As shown in FIG. 8, the slot 132 in the body 131 of the reflector 13 (indicated by an oblique streak in FIG. 8) may be configured to form at least one multi-order stub-type filtering structure. In some embodiments, the slot 132 in the body 131 of the reflector 13 may have a curved profile to form a multi-order stub-type filtering structure. The multi-order stub-type filtering structure can be understood as being combined by multiple single-order stub-type filtering structures 133-3, 133-4, and 133-5. In the embodiment of FIG. 8, no slot 132 is provided between the multiple single-order stub-type filtering structures 133-3, 133-4, and 133-5. However, it is contemplated that a slot 132 may also be provided between the multiple single-order stub-type filtering structures 133-3, 133-4, and 133-5. The multi-order stub-type filtering structure may have a smoother filtering window, or a smaller range of fluctuations within the filter pass band, than the single-order stub-type filtering structure.

Figure 9:
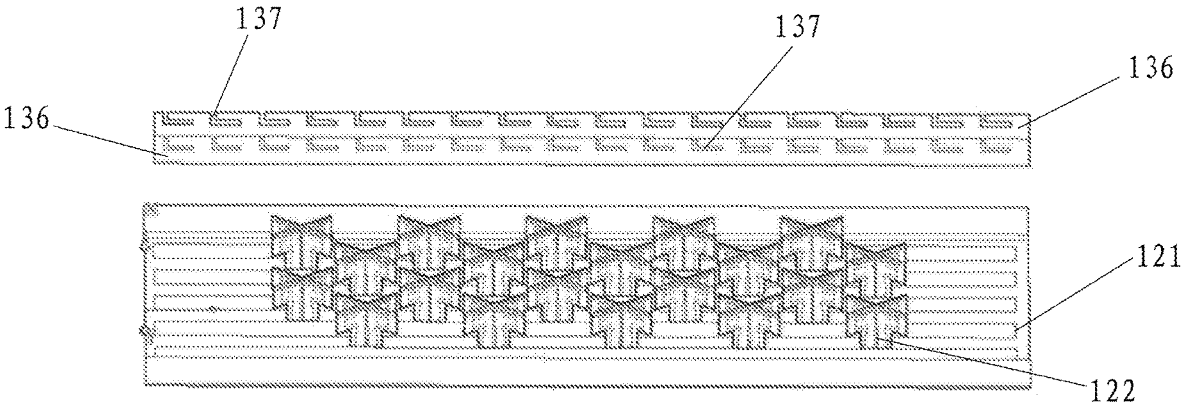
FIG. 9 is a partially schematic three-dimensional view of the base station antenna according to some other embodiments of the present disclosure, wherein the reflector inside the passive module includes a reflective strip section and a fence extending in a forward direction.

FIG. 9 shows a partial side view of the reflector 13 of the base station antenna 10 according to some other embodiments of the present disclosure, and the reflector 13 includes a fence 136 extending along the vertical direction y. The fence 136 extends forwardly from the body 131 of the reflector 13. At least one additional slot 137 may be provided in the fence 136, wherein the at least one additional slot 137 is configured for forming at least one additional stub-type filtering structure in the fence 136. The additional stub-type filtering structure is configured for at least partially inhibiting the induced current within a predetermined frequency band in the fence 136. The arrangement embodiment of the additional stub-type filtering structure formed in the fence 136 may be similar to the arrangement embodiment of the stub-type filtering structure formed in the body 131, which will not be repeated here.

Figure 10:
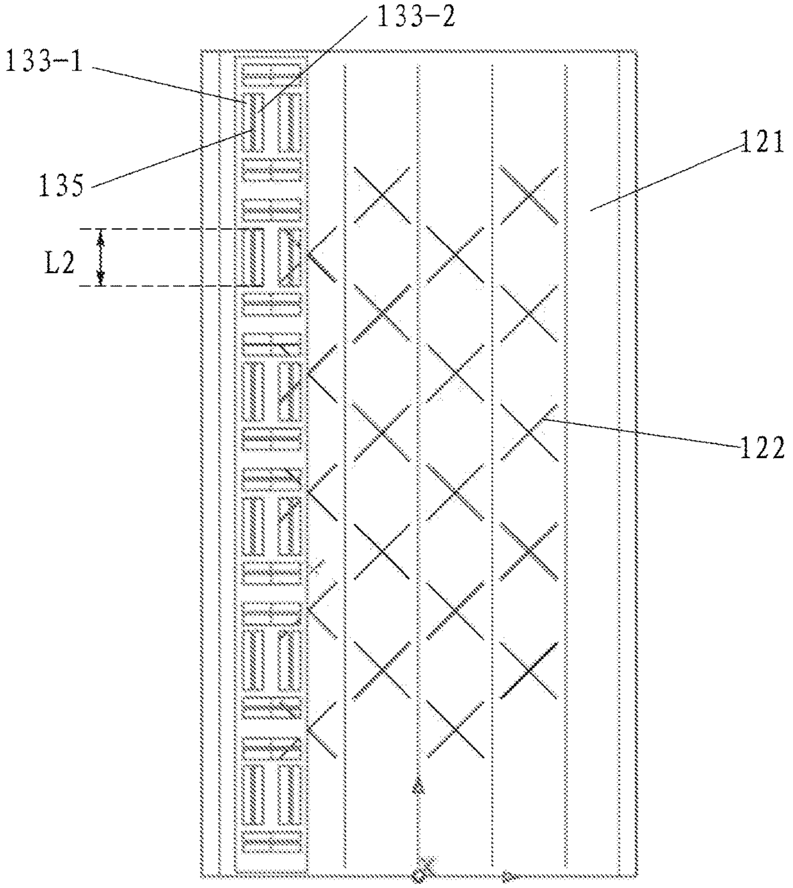
FIG. 10 is a partially schematic front view of the base station antenna according to some other embodiments of the present disclosure, showing the reflective strip section of the reflector inside the passive module together with the reflector and radiating element array inside the active module in the rear.

FIG. 10 shows a partial front view of the reflector 13 of the base station antenna 10 according to some other embodiments of the present disclosure. As shown in FIG. 10, the stub-type filtering structure formed in the body 131 may include at least one closed stub 135. The longitudinal length L2 of the closed stub 135 may be configured as N/2 times the equivalent wavelength, N being a positive integer, wherein the equivalent wavelength is the wavelength at the predetermined frequency point within the predetermined frequency band. Here, "longitudinal length L2 of the closed stub 135" may be understood as the length between two roots of the closed stub 135 (please see the longitudinal length L2 in FIG. 10). The predetermined frequency band may be an operating frequency band of another radiating element 122 inside the active module 12, and the predetermined frequency point may be a center frequency point of the predetermined frequency band. Typically, to reduce the longitudinal length L2 of the closed stub 135, N may be determined as 1. That is, the longitudinal length L2 of the at least one closed stub 135 may be configured as 0.5 times the equivalent wavelength.

In order to form a single closed stub 135, two slots 132-1 and 132-2 may be provided in the body 131 of the reflector 13, and the single closed stub 135 is formed between the two slots 132-1 and 132-2. The two slots 132-1 and 132-2 may be provided to include at least one elongated slot 132 section extending parallel to each other for forming a single closed stub 135. As shown in FIG. 10, the two slots 132-1 and 132-2 may be provided as elongated slots.

In the above part, only the reflector 13 provided inside the passive module 11 of the base station antenna 10 is used as an embodiment to exemplify the technical concepts of the reflector 13 and the base station antenna 10 of the present disclosure. However, these cannot be understood as limiting the present disclosure, and the reflector 13 according to various embodiments of the present disclosure may also be suitably applied to other types of base station antenna 10 according to actual needs.

Although exemplary embodiments of the present disclosure have been described, those skilled in the art should understand that many variations and modifications are possible in the exemplary embodiments without materially departing from the spirit and scope of the present disclosure. Therefore, all variations and changes are included in the protection scope of the present disclosure defined by the claims. The present disclosure is defined by the attached claims, and equivalents of these claims are also included.

The invention claimed is:

1. A reflector for a base station antenna, wherein the reflector comprises:

a body; and at least one slot provided in the body, wherein the at least one slot is configured to form at least one stub filtering structure in the body, and the stub filtering structure is configured to at least partially inhibit an induced current in the body within an operating frequency band of a radiating element mounted behind the reflector.

2. The reflector for the base station antenna according to claim 1, wherein the at least one stub filtering structure includes at least one open stub.

3. The reflector for the base station antenna according to claim 2, wherein the longitudinal length of the at least one open stub is 0.25+n/2 times the equivalent wavelength, n being a natural number, wherein the equivalent wavelength is a wavelength at a predetermined frequency point within the operating frequency band.

4. The reflector for the base station antenna according to claim 2, wherein the at least one slot includes an H-, L-, M-, U-, S-shaped or scalloped slot for forming the at least one open stub.

5. The reflector for the base station antenna according to claim 1, wherein the at least one stub filtering structure includes at least one closed stub.

6. The reflector for the base station antenna according to claim 5, wherein the longitudinal length of the at least one closed stub is N/2 times the equivalent wavelength, and N is a positive integer, wherein the equivalent wavelength is the wavelength at a predetermined frequency point within the operating frequency band.

7. The reflector for the base station antenna according to claim 5, wherein the at least one slot comprises two slots for forming a single closed stub between the two slots.

8. The reflector for the base station antenna according to claim 1, wherein the at least one stub filtering structure comprises multiple stub filtering structures arranged acyclically in at least one direction, and the multiple stub filtering structures include at least one open stub and at least one closed stub.

9. The reflector for the base station antenna according to claim 1, wherein the at least one stub filtering structure comprises:

a first stub filtering structure configured to at least partially inhibit a first induced current within a predetermined first frequency band; and a second stub filtering structure configured to at least partially inhibit a second induced current within a predetermined second frequency band;

wherein the first frequency band is the operating frequency band and is different from the second frequency band.

10. The reflector for the base station antenna according to claim 1, wherein the body includes a reflective strip section extending in a vertical direction, wherein the reflective strip section is configured for mounting a radiating element, and the at least one slot is at least partially provided on the reflective strip section for forming at least one of the stub filtering structures on the reflective strip section.

11. The reflector for the base station antenna according to claim 10, wherein the body includes a first reflective strip section and a second reflective strip section at the side in a horizontal direction, and an opening is provided between the first reflective strip section and the second reflective strip section.

12. The reflector for the base station antenna according to claim 1, wherein the reflector includes a fence extending in a vertical direction, and the fence extends forwardly from the body of the reflector, wherein the at least one additional slot is provided on the fence, wherein the at least one additional slot is configured to form at least one additional stub filtering structure in the fence, and the at least one additional stub filtering structure is configured to at least partially inhibit the induced current within the predetermined frequency band in the fence.

13. A base station antenna, wherein the base station antenna comprises the reflector for the base station antenna according to claim 1, wherein the base station antenna includes a passive module and an active module mounted behind the passive module, wherein a reflector and a reflection compensation plate separated from the reflector are mounted inside the passive module, and the reflection compensation plate includes a frequency-selective surface composed of multiple pattern units arranged periodically.

14. The base station antenna according to claim 13, wherein the frequency-selective surface is configured to reflect electromagnetic waves within a second frequency band and allow electromagnetic waves within a first frequency band to pass through, wherein the first frequency band corresponds to an operating frequency band of at least a portion of the radiating element inside the passive module and the second frequency band corresponds to the operating frequency band.

15. The base station antenna according to claim 13, wherein the reflector includes a first reflective strip section and a second reflective strip section for mounting radiating elements, and that an opening is provided between the first reflective strip section and the second reflective strip section, wherein, the reflection compensation plate is mounted behind the reflector and at least partially overlaps the opening in the projection in the forward direction.

16. A reflector for a base station antenna that comprises a first array of radiating elements and a second array of radiating elements, the reflector comprising:

a body having an opening therein, the body including a first reflective strip and a second reflective strip on opposed sides of the opening;

a first slot provided in the first reflective strip that defines a first stub and a second slot provided in the second reflective strip that defines a second stub, wherein the first stub has a first longitudinal length that is 0.25 times a first wavelength that corresponds to a first frequency within an operating frequency band of the second array of radiating elements and the second stub has a second longitudinal length that is 0.25 times a second wavelength that corresponds to a second frequency within the operating frequency band of the second array of radiating elements.

17. The reflector according to claim 16, wherein the base station antenna comprises an integrated base station antenna that includes a passive module and an active module, and the reflector and the first array of radiating elements are part of the passive module and the second array of radiating elements is part of the active module.

18. The reflector according to claim 17, wherein the active module is mounted rearwardly of the opening in the body of the reflector.

19. The reflector according to claim 16, wherein the first slot is configured to form at a first stub filtering structure that is configured to at least partially inhibit an induced current in the body within an operating frequency band of the second array of radiating elements.

20. A reflector for a base station antenna, the reflector comprising:

a body;

a first stub filtering structure that includes at least one first slot in the body and a second stub filtering structure that includes at least one second slot in the body, wherein the first stub filtering structure is configured to at least partially inhibit a first induced current within a first frequency band and the second stub filtering structure is configured to at least partially inhibit a second induced current within a second frequency band that is different than the first frequency band.

* * * * *